United States Patent [19]

Lammerting et al.

[11] Patent Number: 5,043,409

[45] Date of Patent: Aug. 27, 1991

[54] RELEASE AGENT AND PROCESS FOR THE PREPARATION OF MOLDED POLYURETHANE OR POLYUREA ARTICLES IN THE PRESENCE OF THE RELEASE AGENT

[75] Inventors: Helmut Lammerting, Herbede; Hans-Joachim Kollmeier, Essen; Rolf-Dieter Langenhagen, Hattingen-Niederwenigern, all of Fed. Rep. of Germany

[73] Assignee: Th. Goldschmidt AG, Essen, Fed. Rep. of Germany

[21] Appl. No.: 439,267

[22] Filed: Nov. 20, 1989

Related U.S. Application Data

[63] Continuation-in-part of Ser. No. 194,386, May 16, 1988, abandoned, which is a continuation-in-part of Ser. No. 938,273, Dec. 5, 1986, abandoned.

[30] Foreign Application Priority Data

Jan. 9, 1986 [DE] Fed. Rep. of Germany ....... 3600402

[51] Int. Cl.$^5$ ............................................. C08G 77/12
[52] U.S. Cl. ........................................ 528/31; 528/25; 528/29; 528/15; 556/479; 556/462
[58] Field of Search ....................... 528/31, 25, 29, 15; 556/479, 462

[56] References Cited

U.S. PATENT DOCUMENTS 3,439,014 4/1969 Patton et al. .................... 556/479
4,831,081 5/1989 King, III et al. ................. 556/479

Primary Examiner—Melvyn I. Marquis
Assistant Examiner—Margaret W. Glass
Attorney, Agent, or Firm—Toren, McGeady & Associates

[57] ABSTRACT

In a process for the preparation of molded polyurethane or polyurea articles, especially by the RIM process, internal release agents of the general formula

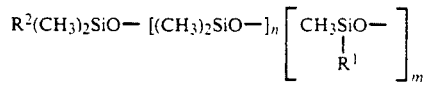

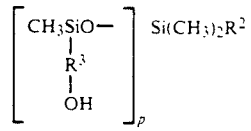

are used. In this formula
$R^1$ = is alkyl with 20 to 40 carbon atoms,
$R^2$ = is $R^1$ or methyl,
$R^3$ = is —(CH$_2$)$_s$— or —[(CH$_2$)$_t$—]$_r$(OC$_2$H$_4$)$_x$—(OC$_3$H$_6$)$_y$—
wherein
s = 3 to 12,
t = 3 to 12,
r = 0 or 1,
x = 0 to 10,
y = 0 to 10,
and the sum of x + y is not less than 1,
n = 0 to 50,
m = 2 to 100, m being greater than n,
p = 0 to 5,
with the proviso that the siloxane has a melting point of not less than 38° C.

The compounds are finely dispersed with an average particle size of not less than 5 to 100μ in amounts of 0.5 to 5 weight percent, based on the reaction formulation. The release agents are preferably suspended in a portion of the polyol or polyolamine that is to be foamed.

The release agents exhibit outstanding release properties and, in the event that molded polyurethane or polyurea articles with a cellular core are prepared, do not prevent the development and/or the maintenance of the cellular structure.

6 Claims, No Drawings

RELEASE AGENT AND PROCESS FOR THE PREPARATION OF MOLDED POLYURETHANE OR POLYUREA ARTICLES IN THE PRESENCE OF THE RELEASE AGENT

CROSS REFERENCE TO PRIOR APPLICATION

This is a continuation-in-part of application Ser. No. 07/194,386, filed May 16, 1988 abandoned, which in turn was a continuation-in-part of application Ser. No. 938,273, filed Dec. 5, 1986, now abandoned.

FIELD OF INVENTION

The invention generally relates to procedures for the preparation of molded polyurethane and polyurea articles in the presence of a release agent.

Considered from one aspect, the invention is concerned with novel release agents and release agent compositions. Considered from another aspect, the invention is directed to a process for the preparation of molded polyurethane or polyurea articles which may have a cellular core, especially by the RIM method. Pursuant to the process, at least one polyol or polyolamine is reacted with an organic di- or polyisocyanate in the presence of catalysts and, if desired or required, conventional additives, such as cross linkers, blowing agents, stabilizers, cell regulators, pigments and fillers, the process being carried out in the presence of an internal release agent. The invention is also concerned with the molded articles obtained by the procedure.

BACKGROUND INFORMATION AND PRIOR ART

Molded polyurethane articles are used on a large scale in the automobile industry as body parts, such as aprons, spoilers, fenders and the like because of their toughness and wear resistance; they are also suitable as shoe soles, heels and for many other purposes.

The polyurethanes are cured and simultaneously molded in closed, heated molds. The reaction injection molding process, the so-called RIM process, has gained particular importance for this purpose.

More recently, molded polyurea articles have been introduced, wherein the terminal hydroxyl groups of the polyols, used in the manufacture of molded polyurethane articles, are replaced by $NH_2$ groups, so that amines are formed. These amines which are termed polyol amines or polyoxyalkylene amines, react with the polyisocyanates in the same manner as do the polyols. The products obtained, however, are not polyurethanes, but polyureas. Otherwise, the same process conditions and the same release agents are employed.

A significant problem in the molding procedure is that the molded polyurethane or polyurea parts tend to adhere to the inner walls of the mold. Release agents are known in large numbers to those skilled in the art and entrusted with the production of molded articles from reactive compositions to deal with this problem. Such release agents may be applied on the inner walls of the molds or added as internal release agents to the reaction formulation. The internal release agents may belong to different classes of substances. As internal release agents, metal soaps, such as zinc stearate, esters of higher fatty acids, natural or synthetic oils, waxes or silicones have been used in the past.

Those products are particularly preferred as internal release agents, which make special preparation of the molds superfluous, do not adversely affect the properties of the reacted, molded plastic and, as far as possible, do not cause any change in the surface properties of the molded parts, such as an adverse effect on the paintability or application of other coatings. The internal release agents should be well dispersible in the reaction formulation. However, in order to exert their release effect, they should accumulate at the surface of the molded article.

Examples of internal release agents which are to be used especially for the production of molded polyurethane articles by the RIM process, are organosilicon block copolymers which, aside from siloxane blocks, have polyoxyalkylene blocks. The structure of the compounds evidently plays an important role in determining the release behavior.

For example, it may be inferred from German Offenlegungsschrift 25 43 638 that compounds of the formula

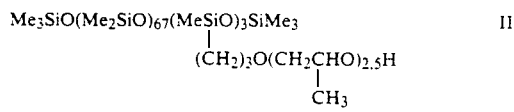

are said to be inferior to compounds of the formula

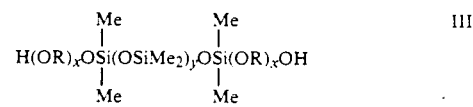

and/or

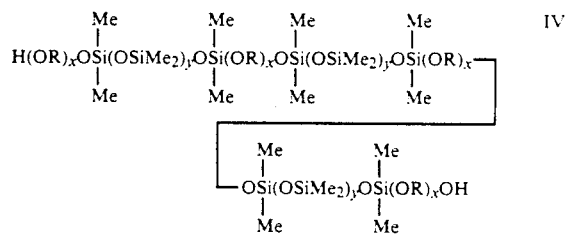

the subscripts x in formulas III and IV in each case having an average value of 3 to 45, the subscript y having an average value of 8 to 198, Me representing methyl and $(-OR)_x$ representing a polyoxyalkylene polymer or a polyoxyalkylene copolymer, R being composed of ethylene groups or butylene groups or mixtures of ethylene or butylene groups with propylene groups, the ratio of ethylene or butylene groups to propylene groups being selected so that the ratio of carbon atoms to oxygen atoms in the whole of the (—OR) block is 2.0:1 to 2.9:1.

Test methods for determining and comparing the releaseability of different release agents are also given in this Offenlegungsschrift.

Later work shows that certain functional groups can improve the releaseability. Siloxanes with such functional groups are known from U.S. Pat. No. 4,076,695. As functional groups, these siloxanes contain carboxyl groups attached to hydrocarbon groups which, in turn, are connected over an Si—C— or an SiOC— bond with the siloxane framework. These release agents with carboxyl groups do not, however, form stable mixtures with polyols which contain amine catalysts and, optionally, tin catalysts. Moreover, the gelling time of the polyurethane system is prolonged by the addition of these compounds.

Because of their reactivity, these compounds cannot be used as a constituent of the isocyanate component.

These disadvantages were largely overcome by using as release agents the organosilicon compounds described in U.S. Pat. No. 4,472,341. These silicones have

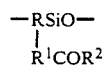

units, R being a low molecular weight alkyl or aryl group. $R^1$ is bivalent hydrocarbon group which may contain oxygen or sulfur atoms. $R^2$ is a low molecular weight alkoxy, aroxy or $R^3O(CHR^4CH_2O-)_x$ group, $R^3$ being hydrogen or a lower alkyl group and $R^4$ hydrogen or methyl and x having a value of 1 to 50. However, its release behavior is not entirely satisfactory. The same is true for siloxanes with organically bound $CONR_2$ groups, R representing hydrogen.

A further disadvantage of the known internal release agents is that, in the manufacture of molded polyurethane or polyurea articles with a cellular core, they hinder the development or maintenance of the cellular structure and may even cause collapse of the formed foam. The development of the cellular structure in the interior of the molded article is, however, of importance for obtaining molded articles having defect-free surfaces, as well as with respect to the mechanical properties of the molded article obtained.

Reference is also had to U.S. Pat. No. 4,498,929 which discloses functional siloxane release agents to be used with liquid silicone surfactants. The release agent is preferably used in liquid form.

OBJECTS OF THE INVENTION

It is therefore a primary object of the present invention to provide internal release agents for the manufacture of molded polyurethane and polyurea articles, especially by the RIM process which are superior to the known internal release agents with respect to their release properties, which fulfill the initially indicated requirements in an optimum manner and, moreover, in the event that molded polyurethane or polyurea articles with a cellular core are manufactured, do not prevent or impair the development and/or maintenance of the cellular structure.

Generally, it is an object of this invention to improve on the art of manufacturing molded polyurethane and polyurea articles in the presence of release agents.

SUMMARY OF THE INVENTION

Surprisingly, the above objects are achieved by using release agents of the general formula

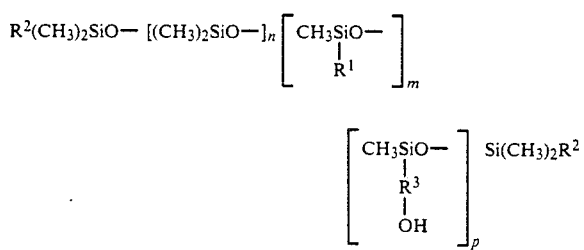

wherein
$R^1$ = is alkyl with 20 to 40 carbon atoms,
$R^2$ = is $R^1$ or methyl,
$R^3$ = is $-(CH_2)_s-$ or $-[(CH_2)_r-]_t(OC_2H_4)_x-(OC_3H_6)_y-$
wherein
s = 3 to 12,
t = 3 to 12,
r = 0 or 1,
x = 0 to 10,
y = 0 to 10,
and the sum of x+y is not less than 1,
n = 0 to 50,
m = 2 to 100, m being greater than n,
p = 0 to 5,
with the proviso that the siloxane has a melting point of not less than 30° C.

The release agents, to be used in the inventive process, thus are polymers which comprise linear methylpolysiloxane and which have lateral (comb-like) and, optionally, terminal long-chain hydrocarbon groups. These groups, labelled $R^1$, essentially determine the melting point of the polymers. The melting point of the compounds increases as the number of carbon atoms increases. It is of fundamental importance that the compounds used as release agents in accordance with the invention are present in the solid state up to a temperature of 30° C., yet melt at the temperature assumed by the walls of the mold during the implementation of the process. Usually, the walls of the mold have a temperature of about 40° to 80° C. during the process.

The siloxanes to be used in the inventive process may have methylsiloxy units to the silicon atoms of which an $R^3OH$ group is linked. By these means, it is additionally accomplished that the release agents, by virtue of their reactivity with the di- or polyisocyanate, are incorporated chemically in the polyurethane matrix so that a later migration to the surface is precluded.

The $R^1$ group endows the polymers with a certain degree of incompatibility in the polyurethane or polyurea that is formed. This incompatibility increases as the number of carbon atoms increases and causes a preferred accumulation at the interfaces. It has been ascertained that these release agents do not affect nucleation, that is, the development and maintenance of the cell structure so that a uniform internal pressure is maintained during the molding process and a defect-free surface of the molded article is obtained. By avoiding disorders of the cellular structure in the interior of the mold, molded articles having good mechanical properties are obtained. The later processing, especially the painting or other coating of the molded articles obtained, is not affected by the inventively added release agents. The parts produced are free of pinholes and sink marks.

It has been ascertained that, by selecting the $R^1$-alkyl groups with 20 to 40 carbon atoms, the requisite that the release agent is in solid form initially, but melts at a temperature above 30°, is fully satisfied. If the number of carbon atoms of the $R^1$ groups would be less than 20, while the values of n are relatively high, the possibility of obtaining release agents with a melting point of the siloxane below 30° C. is great. The requirement that the release agent is solid up to a temperature of 30° C. is not arbitrary, but is based on the realization that prior art release agents, if used in an equivalent process, have an undesired defoaming activity which prevents the development of the desired cellular structure of the foam. In other words, if the release agents are too compatible with the foaming system, the former exert a significant defoaming action which should be avoided.

Within the claimed meanings for the groups $R^1$, $R^2$ and $R^3$, as well as the subscripts n, m and p, the following groups and subscripts are preferred individually or in combinations.

$R^1$ is preferably alkyl with 20 to 30 carbon atoms. The alkyl groups within the polymer molecule may have a varying number of carbon atoms. This is the case, for example, when the modified siloxanes which are to be used in accordance with the invention are obtained by the reaction of hydrogen siloxanes, that is, compounds in which the $R^1$ group represents a hydrogen atom, with α-olefins, and these α-olefins are used as mixtures of olefins with, for example, 20 to 24 or 24 to 28 carbon atoms.

Prior art release agents, such as disclosed in the Robertson U.S. Pat. No. 4,498,929, are employed in liquid form throughout the process. It has been ascertained that employment of the release agent in liquid form at the outset of the process is disadvantageous for the reasons stated above. It should be emphasized, however, that the requirement of a minimum length of the carbon chain in the $R^1$ group, to wit 20 carbon atoms, is generally not sufficient to obtain the desired solid form, but a second requirement is necessary. The second requirement is the ratio of the dimethylsiloxy units: methyl-$R^1$-siloxy units. This ratio is expressed by the ratio of the subscripts n:m. The dimethylsiloxy units have a liquifying effect. Accordingly, pursuant to the present invention, in the compounds of the present release agent, the subscript n has a value of from 0 to 50, while the subscript m has a value of from 2 to 100, however, m has to be greater than n. This, in turn, results in a predetermined ratio of $CH_3$ groups: $R^1$ groups as follows:

| Number of n Units | Number of m Units | $CH_3:R^1$ | $R^1$ % |
|---|---|---|---|
| 0 | 2 | 1 | 50 |
| 50 | 51 | 2.96 | 25.25 |
| 50 | 100 | 2 | 33.33 |

$R^2$ is preferably methyl.

$R^3$ is a bivalent alkylene of the formula $-(CH_2)_s-$, in which s is a number from 3 to 12. $R^3$ however may also be a group comprising oxyalkylene units, said group has the formula $-[(CH_2)_t-]_r(OC_2H_4)_x-(OC_3H_6)_y-$, in which s=3 to 12, t=3 to 12, r=0 or 1, x=0 to 10, y=0 to 10, and the sum of x+y is not less than 1.

Preferably t has a value of 2 or 3.

The subscript n, which indicates the number of dimethylsiloxy units, preferably has a value of 0 to 10.

The subscript m, which determines the number of methylsiloxy units substituted with long-chain alkyl, preferably has a value of 5 to 80 and especially a value of 50 to 80.

The number of methylsiloxy units to which hydroxyl groups are linked over the bivalent group $R^3$ is given by a subscript p and preferably is 1 or 2.

The compounds shown in the following are examples of release agents to be used in the inventive process.

Compound A:

$R^1$ = alkyl with 24 to 28 carbon atoms.

Compound B:

$R^1$ = alkyl with 20 to 24 carbon atoms.

Compound C:

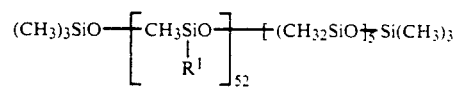

$R^1$ = alkyl with 30 to 36 carbon atoms.

Compound D:

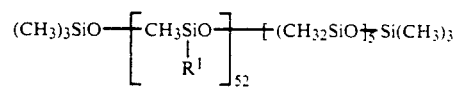

$R^1$ = alkyl with 24 to 28 carbon atoms.

Compound E:

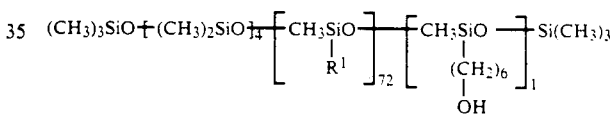

$R^1$ = alkyl with 24 to 28 carbon atoms.

Compound F:

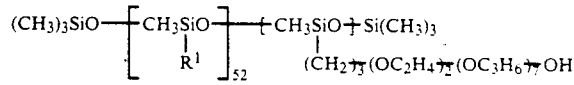

$R^1$ = alkyl with 28 to 32 carbon atoms.

The release agents are used in the inventive process preferably in the form of a 10 to 30 weight percent suspension, the outer phase of which is formed by a portion of the polyol or polyamine used for the foaming. It is not desirable to add the release agent to the isocyanate component. To obtain the suspension, the modified siloxanes may first be suspended relatively coarsely in the polyol or polyamine. The polymers are then comminuted in the polyol or polyamine, for example, by passing the initially obtained coarse suspension repeatedly through a cylinder mill until the desired particle size of not less than 1 to 100μ is reached. Particularly preferred are suspensions in which the inner phase has a particle size of 10 to 20μ. Those skilled in the art are also familiar with other methods of comminuting or dispersing, such as atomizing the molten compound in a stream of gas or grinding the compounds, optionally in the presence of polyol or polyamine, in a ball mill. It is also possible to produce first of all an emulsion of the molten, modified siloxanes using suitable emulsifiers, such as ethylene oxide adducts of fatty alcohols and to obtain the desired, finely divided dispersion by cooling the emulsion below the melting point of the siloxanes.

The release agents to be employed pursuant to the invention are used in an amount of 0.5 to 5 weight percent and preferably of 1 to 3 weight percent, based on the reaction formulation.

The release agents to be used pursuant to the invention are synthesized by known procedures, for example, by the addition of olefins with 20 to 40 carbon atoms as well as, if necessary, oxyalkylene derivatives of an unsaturated alcohol, such as allyl alcohol, or olefins with terminal primary or secondary hydroxyl groups in the presence of a platinum catalyst to a polydiorganosiloxane of the desired structure which has SiH groups. Such methods are described in U.S. Pat. Nos. 2,846,458, 3,234,252, 3,427,271 and 4,047,958.

The release agent, pursuant to the invention, is advantageously added to the reaction mixture for the preparation of multi-polyurethane or polyurea articles in the form of a composition which comprises 10 to 40 percent by weight of compounds pursuant to Formula I, 0 to 20 percent by weight of an emulsifier, with the remainder being polyol or polyamine of the same kind as used in the reaction mixture. Non-ionogenic emulsifiers are advantageously used for this purpose, i.e., addition products of ethylene oxide or ethylene oxide and propylene oxide to compounds with an acidic hydrogen atom. Fatty alcohols or amines are particularly suitable for this purpose. The composition is in the form of a dispersion of the organosilicon compound in the polyol or polyamine. From a practical point of view, the emulsifier and the organosilicon compound are added to the polyol or polyamine, whereupon, by the application of heat, the organosilicon compound is melted. With the aid of a strong agitator, for example, a so-called ultra Turrax stirrer which operates pursuant to the rotor-stator principle, an emulsion of the organosilicon compound in the polyol or polyamine are produced. The dispersion temperature is preferably 60° to 100° C. This composition is then cooled while vigorously stirring. Dispersion of fine particle size of the organosilicon compound in the polyol or polyamine having a particle size of about 5 to 10μ is obtained in this manner.

As to the nature of the polyol to be used in the reaction mixture for the formation of the molded polyurethane articles and also as the outer phase for the release agent dispersion, those polyols are advantageously employed which are normally used pursuant to the state of the art in the RIM procedure. These are addition products of ethylene oxide and propylene oxide to multivalent alcohols. Particularly, glycerin and trimethylolpropane are suitable multivalent alcohols for this purpose. Trimethylpropane is the most commonly used starting alcohol. Ethylene oxide and/or propylene oxide are then added to these multivalent alcohols by an addition reaction. If both ethylene oxide and also propylene oxide are added, the addition may proceed statistically or blockwise. Blockwise addition is preferred. In proceeding in this manner, the entire amount of ethylene oxide or a partial amount thereof is added at the end in order to assure that, at the end of the polyoxyalkylene chain, primary hydroxyl groups are available for the reaction with the polyisocyanate. Advantageously, 40 to 70 percent of the terminal hydroxyl groups should be primary hydroxyl groups. The weight ratio of ethylene oxide:propylene oxide amounts usually to 10:90 to 20:80. Ethylene oxide and/or propylene oxide is added in such amounts that there results a hydroxyl number of 24 to 36. The mole weight of the polyol should preferably be 4,500 to 6,000.

In the following examples, the preparation of molded polyurethane articles corresponding to the invention is shown. At the same time, the effectiveness of the release agents which are to be used inventively, is compared with that of products of the state of the art. For this purpose, release experiments and air loading experiments were carried out in the laboratory. It should be appreciated that the examples are given by way of illustration and not limitation.

RELEASE EXPERIMENTS

For this purpose, a typical RIM formulation is prepared with a hand mixer. The mixture is added to a test mold in which it is allowed to react. Internal release agents of the state of the art and release agents which are to be used in the inventive process are added to formulations and under process conditions which are otherwise the same. In addition, a test foaming is carried out without the addition of a release agent.

Experimental Procedure

A polyether polyol (80 parts by weight) with an OH number of 27 which was synthesized by the addition of propylene oxide to trimethylolpropane and the subsequent addition of ethylene oxide, is mixed with 28 parts by weight of ethylene glycol, 0.35 parts by weight of triethylenediamine, 0.02 parts by weight to tin dibutyl dilaurate and 25 parts by weight of a dispersion of a release agent, comprising 5 parts by weight of the inventive release agent and 20 parts by weight of the polyether polyol used above. To prepare the dispersion, the inventive substance is comminuted and dispersed uniformly with a serrated dispersing disk in the polyether polyol used above. The mixture obtained is then milled on a three-roller mill until the solid material has an average particle size of 15μ.

As isocyanate, a product is used which is obtained by reacting 4,4-diisocyanatodiphenylmethane with tripropylene glycol; it has an NCO content of 23% (isocyanate component). In each case, 100 parts by weight of the polyol component are mixed with 127 parts by weight of the isocyanate component by intensively stirring with a laboratory mixer at 2,500 revolutions in 7 seconds. The reaction mixture which is still present in liquid form is poured into a closable aluminum mold which has been heated to 70° C. The mold is closed with a separate cover which is secured with screw clamps. Before the reaction composition is poured into the mold, the inner surfaces of the mold and the inside of the cover which is used to close the mold are provided with a release agent. For this purpose, the release agent is applied very thickly with a rag and polished. After a molding time of 4 minutes, the cover is removed from the mold and the tensile force required for this is measured with a spring balance. If no internal release agent is used, the cover adheres to the reaction material so that, when the cover is forcefully removed, the surface of the molded article is damaged and parts of the reaction material adhere to the inside of the cover. When an internal release agent is used, the removal of the cover becomes significantly easier and damage to the surface of the molded article is avoided. The results of the comparison experiments are arranged in the following Table.

As organosilicon polymers, used pursuant to the invention, the above compounds A to F are used.

As products of the state of the art, the following are used:
Compound G, according to U.S. Pat. No. 4,076,695
Compound H, according to German Offenlegungsschrift 25 43 638
Compound I, zinc stearate.

To check the comparison compounds G and H, 100 parts by weight of the previously used polyether polyol are mixed with 28 parts by weight of ethylene glycol, 0.35 parts by weight to triethylenediamine, 0.02 parts by weight of tin dibutyl dilaurate and 5 parts by weight of the comparison compound. Subsequently, the procedure is the same as that used to check the inventive substances. The release forces are also measured.

The comparison compound I (zinc stearate) is dispersed in the polyether polyol used in much the same way as the compounds which are to be used in the inventive process, and a 20 weight percent dispersion is prepared, an average particle diameter of $18\mu$ being attained. After this, the testing procedure is the same as that for the inventive substances.

The amount of release agent added in each case is 1.65 weight percent based on the reaction formulation.

TABLE

| Product | Release Force [N/100 cm²] |
|---|---|
| Blank test without additive | 40 |
| Release Agents of the Invention | |
| Compound A | 14 |
| Compound B | 16 |
| Compound C | 15 |
| Compound D | 20 |
| Compound E | 20 |
| Compound F | 19 |
| Release Agents not of the Invention | |
| Compound G | 24 |
| Compound H | 23 |
| Compound I | 35 |

The release forces measured confirm the high effectiveness of the release agents to be used for the inventive process.

AIR LOADING EXPERIMENTS

In a separate test, the air loading ability of polyol components, after addition of the inventive substances, is measured and compared with that of products of the state of the art. To carry out the experiments, 88 parts by weight of the previously used polyether polyol are mixed with 28 parts by weight of ethylene glycol, 0.35 parts by weight of triethylenediamine, 0.02 parts by weight of tin dibutyl dilaurate and 15 parts by weight of a 20 weight percent dispersion of the compounds A to F.

This mixture is stirred intensively for 4 minutes at 2,300 r.p.m., so as to beat in as much air as possible. After this, 70 g are weighed into a cylinder and, immediately afterwards, the height to which the cylinder is filled by this liquid-air mixture is measured.

To check the comparison substances G and H, 100 parts by weight of the polyether polyol used are mixed with 28 parts by weight of ethylene glycol, 0.35 parts by weight of triethylenediamine, 0.02 parts by weight of tin dibutyl dilaurate and 3 parts by weight of the aforementioned substances. To measure the air loading, a procedure analogous to that employed to check the inventive substance is used.

To check comparison substance I, a 20% dispersion in a polyether polyol, like that described before, is used. The testing procedure is analogous to that described above for checking the inventive substances.

The results of the air-loading test are listed in the Table below.

| Product | Filling Height in mL |
|---|---|
| Blank test without additive | 77 |
| Release Agents of the Invention | |
| Compound A | 77.5 |
| Compound B | 77.5 |
| Compound C | 84 |
| Compound D | 76.5 |
| Compound E | 77.0 |
| Compound F | 78.0 |
| Release Agents not of the Invention | |
| Compound G | 72.5 (no air bubbles discernible) |
| Compound H | 72 |
| Compound I | 85 |

The results show that the substances which are to be used inventively are in a position to enable the polyol components to be loaded with air. Comparison substances G and H prevent the formation of a stable air/polyol mixture. Zinc stearate (comparison compound I) enables the polyol components to be loaded with air; however, compared to the substances which are to be used inventively, it exhibits a significantly lower release effect.

What is claimed is:

1. A release agent suitable for use in the production of molded polyurethane or polyurea articles, said agent being a compound of the formula

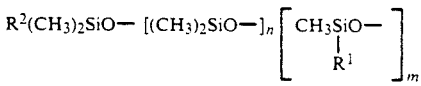

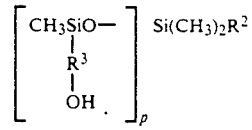

wherein
$R^1$ = is alkyl with 20 to 40 carbon atoms,
$R^2$ = is $R^1$ or methyl,
$R^3$ = is $-(CH_2)_s-$ or $-[(CH_2)_r-](OC_2H_4)_x-(OC_3H_6)_y-$
wherein
s = 3 to 12,
t = 3 to 12,
r = 0 or 1,
x = 0 to 10,
y = 0 to 10,
and the sum of x + y is not less than 1,
n = 0 to 50,
m = 2 to 100, m being greater than n,
p = 0 to 5, with the proviso that the siloxane has a melting point of not less than 30° C.

2. The release agent of claim 1, wherein $R^1$ is alkyl with 20-30 carbon atoms.

3. The release agent of claim 1, wherein $R^2$ is methyl.

4. The release agent of claim 1, wherein m=5-80.

5. The release agent of claim 1, wherein p=1 or 2.

6. The release agent of claim 1, wherein the compound is selected from the group consisting of

wherein $R^1$ is alkyl with 24-28 carbon atoms,

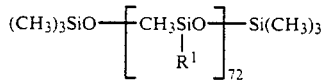

wherein $R^1$ is alkyl with 20-24 carbon atoms,

wherein $R^1$ is alkyl with 30-36 carbon atoms,

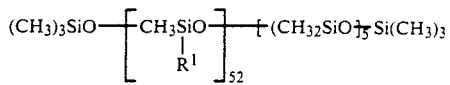

wherein $R^1$ is alkyl with 24-28 carbon atoms,

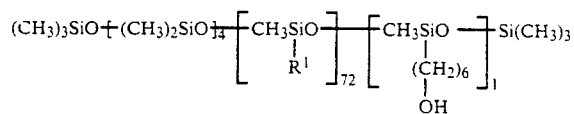

wherein $R^1$ is alkyl with 24-28 carbon atoms, and

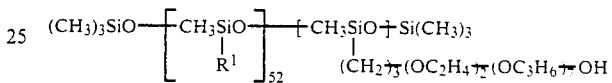

wherein $R^1$ is alkyl with 28-32 carbon atoms.

* * * * *